United States Patent
Black et al.

(10) Patent No.: US 7,542,931 B2
(45) Date of Patent: Jun. 2, 2009

(54) SYSTEM AND METHOD FOR GLOBAL AUTOMATED ADDRESS VERIFICATION

(75) Inventors: Catherine B. Black, Scottsdale, AZ (US); Diane Farrell, Phoenix, AZ (US); Chin H. Khor, Glendale, AZ (US); Vernon Marshall, Montclair, NJ (US); Sandeep Sacheti, Jersey City, NJ (US); Tracy J. Steiner, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1413 days.

(21) Appl. No.: 10/162,282

(22) Filed: Jun. 3, 2002

(65) Prior Publication Data
US 2003/0023541 A1    Jan. 30, 2003

Related U.S. Application Data

(60) Provisional application No. 60/295,295, filed on Jun. 1, 2001.

(51) Int. Cl.
*G06Q 40/00* (2006.01)
(52) U.S. Cl. ............................. 705/35; 705/38; 238/57; 238/58; 238/59; 455/406; 455/407; 455/408; 455/409; 379/114.03; 379/114.15; 379/114.19
(58) Field of Classification Search .................. 705/39, 705/35, 38; 283/57–59; 45/406–409
See application file for complete search history.

(56) References Cited

U.S. PATENT DOCUMENTS

| | | | |
|---|---|---|---|
| 5,963,915 A | 10/1999 | Kirsch | |
| 6,000,832 A | 12/1999 | Franklin et al. | |
| 6,032,136 A | 2/2000 | Brake, Jr. et al. | |
| 6,095,413 A | 8/2000 | Tetro et al. | |
| 6,122,624 A | 9/2000 | Tetro et al. | |
| 2002/0120846 A1 | 8/2002 | Stewart et al. | |
| 2002/0174065 A1 | 11/2002 | Coward | |

(Continued)

FOREIGN PATENT DOCUMENTS

CA    2304293    10/2000

OTHER PUBLICATIONS

Badnarz, Ann, Network World, v22n25, pp. 29-30, Jun. 27, 2005, Tool processes finance data on the fly.*

*Primary Examiner*—Kirsten S Apple
(74) *Attorney, Agent, or Firm*—Sterne, Kessler, Goldstein & Fox P.L.L.C.

(57) ABSTRACT

The present invention provides systems and methods for global address verification of a transaction, such as a transaction card purchase. In accordance with an exemplary embodiment of the present invention, the system verifies a billing address and/or an alternate address (e.g., shipping address) in a single transaction. The billing address and/or the alternate address are associated with a transaction card purchaser. If the billing and/or alternate addresses are verified, then the transaction card issuer may offer a payment guarantee to the merchant. The merchant may choose to ship the purchased item to either a billing address or an alternate address. If the address is not verified, then the transaction card issuer may choose not to offer a payment guarantee to the merchant, and the merchant may choose not to ship the item to the alternate address.

17 Claims, 2 Drawing Sheets

U.S. PATENT DOCUMENTS

2006/0167822 A1* 7/2006 Krause et al. .................. 705/75
2007/0174164 A1 7/2007 Biffle et al.
2007/0174208 A1 7/2007 Black et al.

* cited by examiner

SYSTEM AND METHOD FOR GLOBAL AUTOMATED ADDRESS VERIFICATION

CROSS REFERENCE TO RELATED APPLICATIONS

This application claims priority to, and the benefit of, U.S. Provisional Patent Application Ser. No. 60/295,295, entitled "Global Automated Address Verification System and Method," filed Jun. 1, 2001, the entire content of which is hereby incorporated by reference.

FIELD OF INVENTION

The present invention relates generally to the detection of fraudulent transaction card usage and, more particularly, to the verification of an alternate address for a transaction where the billing and alternate addresses are different.

BACKGROUND OF THE INVENTION

Transaction cards, such as credit cards, charge cards, debit cards, stored value cards, smart cards, and the like, are often used to conveniently purchase goods for delivery. However, such transactions inherently possess some degree of risk, since buyer information used to conduct the transaction is typically contained on the face of the transaction card. If the transaction card is stolen or lost, an unauthorized user may often complete purchases by presenting the transaction card number to a merchant. Unauthorized transaction card use is more difficult when the unauthorized user presents the card to the merchant in person, since the merchant may require further identification, such as a driver's license, and may compare the signature on the receipt to that on the back of the card. However, if an unauthorized card user purchases from a remote location via an electronic medium, such as the telephone, the Internet, or another card not present situation, a merchant cannot use these conventional techniques for avoiding transaction card fraud.

One method for preventing fraudulent electronic transaction card transactions is to verify the billing address of the card-holder. In some currently available systems requiring address verification, purchasers must provide their billing addresses along with their transaction card information when making a purchase via phone or Internet. Financial institutions that issue transaction cards have billing addresses for each of their card-holders stored in a database, along with associated card-holder information. Typically, when transaction card information is presented to the financial institution from a merchant for authorization, the stored billing address associated with the transaction card number submitted for authorization is compared with the billing address input by the purchaser to verify a match. If the addresses do not correlate, then the purchaser is deemed to be an unauthorized user, and the merchant and/or the card issuer may deny approval of the transaction.

Furthermore, transaction card issuers often give merchants payment guarantees, so long as purchased goods are shipped only to billing addresses. The card issuer offers such guarantees because the billing address typically can be verified as part of the authorization process, using methods like the one described above. However, if a merchant agrees to ship goods to an address other than the transaction card billing address, the card issuer typically refuses to make a payment guarantee, and, thus, the merchant is responsible if fraud occurs. As a result, many merchants refuse to ship goods to addresses other than the billing address. This makes many transactions difficult. For example, a card-holder might not be able to use a transaction card over the phone to buy a gift for delivery to a friend at another address.

In view of the foregoing, a need exists for systems and methods for verifying alternate addresses, as well as billing addresses, during authorization of remote transaction card purchases. Moreover, a need exists for a method that facilitates the reduction of transaction card fraud and enhances the ability of transaction card companies to make payment guarantees to merchants who ship items to addresses other than billing addresses.

SUMMARY OF THE INVENTION

The present invention provides systems and methods for global address verification associated with a transaction, such as a transaction card purchase. In accordance with an exemplary embodiment, the present invention includes a merchant system for submitting data to a host authorization system, where the merchant system and the host authorization system communicate via a communication channel and the data submitted to the host authorization system includes information associated with a card-holder. A verification system coupled to the host authorization system via the communication channel retrieves data from the host authorization system associated with the verification of an alternate address. The verification system and host authorization system can provide verification of the billing address and the alternate address in a single transaction. The host authorization system provides a guarantee for payment to the merchant system based on the verification of the billing and/or alternate address.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and wherein:

DETAILED DESCRIPTION

The following disclosure presents and describes various exemplary embodiments in sufficient detail to enable those skilled in the art to practice the invention, and it should be understood that other embodiments may be realized without departing from the spirit and scope of the invention. Thus, the following detailed description is presented for purposes of illustration only, and not of limitation, and the scope of the invention is defined solely by the appended claims.

Systems and methods in accordance with various aspects of the present invention facilitate verification of alternate and billing addresses for transaction card account purchases. In an exemplary embodiment, a merchant receives information including an alternate address, a card-holder billing address, and/or the like, from a card-holder. The merchant forwards this information to a transaction card issuer's host authorization system, which may verify some or all of the information and may send shipping information to a verification system. The verification system verifies the shipping information by comparing the provided information with information in various databases. When a comparison has been made, the verification system transmits the results of the comparison to the host authorization system. If the shipping information matches information stored by the verification system, the transaction card issuer may offer a payment guarantee to the merchant. The merchant may authorize the purchase and ship the purchased item to the alternate address, which may be different from the billing address. If the shipping information does not match information stored by the verification system, the card issuer may choose not to offer a payment guarantee to the merchant. In this case, the merchant may choose to deny the shipping request and/or the purchase.

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, eXtensible Markup Language (XML), or the like, with the various algorithms being implemented with any combination of data structures, objects, processes, routines, or other programming elements. Further, it should be noted that the present invention may employ any number of conventional techniques for data transmission, signaling, data processing, network control, and the like.

The particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical address verification system implemented in accordance with the invention.

Communication between participants in the system of the present invention is accomplished through any suitable communication channel, such as, for example, a telephone network, public switch telephone network, intranet, Internet, extranet, WAN, LAN, point of interaction device (e.g., point of sale device, personal digital assistant, cellular phone, kiosk terminal, automated teller machine (ATM), and/or the like), online communications, off-line communications, wireless communications, satellite communications, and/or the like. The network may also be implemented as other types of networks, such as an interactive television (ITV) network. It will appreciated that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Each participant or user of the system of the present invention, including purchasers, merchants, card issuers, and third-party verifiers, for example, may be equipped with a suitable computing system to facilitate communications and transactions with any other participant. For example, some or all participants may have access to a computing unit in the form of a personal computer, although other types of computing units may be used, including laptops, notebooks, handheld computers (e.g., a Palm Pilot®), set-top boxes, kiosk terminals, personal digital assistants, cellular phones, and the like. Additionally, other participants may have computing systems which may be implemented in the form of a computer server, PC server, workstation, minicomputer, mainframe, a networked set of computers, or any other suitable implementations which are known in the art or may hereafter be devised. A participant's computing system may include any suitable operating system, such as any version of Windows, Windows NT, Windows 2000, Windows 98, Windows 95, MacOS, OS/2, BeOS, Linux, UNIX, or the like. Further, although the invention may be described herein as being implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having functionality similar to that described herein.

The computing systems may be connected with each other via a data communications network, as described more fully above. For example, the network may be a public network, which is assumed to be insecure and open to eavesdroppers. In one embodiment, the network is embodied as the Internet. In this context, the computers may or may not be connected to the Internet at all times. For instance, a purchaser's computer may employ a modem to occasionally connect to the Internet, whereas a merchant computing system, a card issuer computing system, and/or a verification system's computing system might maintain a permanent connection to the Internet. Specific information related to the protocols, standards, and application software utilized associated with the Internet are not discussed herein. For further information regarding such details, see, for example, Dilip Naik, *Internet Standards and Protocols* (1998); *Java 2 Complete*, various authors (Sybex 1999); Deborah Ray and Eric Ray, *Mastering HTML 4.0* (1997); and Loshin, *TCP/IP Clearly Explained* (1997). Each of these texts is hereby incorporated by reference.

The merchant's computer system may also be interconnected to a card issuer via a second network, referred to as a payment network. The payment network represents existing proprietary networks that presently accommodate transactions for credit cards, debit cards, and other types of financial instruments or banking cards. The payment network is a closed network that is assumed to be secure from eavesdroppers. Examples of the payment network include the American Express®, VisaNet®, and Veriphone® networks.

As will be appreciated, the present invention may be embodied as a method, a data processing system, a device for data processing, and/or a computer program product. Accordingly, aspects of the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose, hardware-based computer systems which perform the specified functions or steps, or suitable combinations of special purpose hardware and computer instructions.

As used herein, the terms "user" and "participant" may interchangeably include any person, entity, charitable organization, machine, hardware, software, or business who accesses and uses the system of the invention, including purchasers, merchants, card issuers, and verification systems. Participants in the system may interact with one another either online or off-line. It is further noted that other participants may be involved in various embodiments of the invention, such as an intermediary settlement institution, though these participants are not always described in detail.

As used herein, the term "online" may include interactive communications that take place between participants who are remotely located from one another, including communication through any of the networks or communications means described herein or the like.

The term "merchant" may include any person, entity, charitable organization, machine, software, hardware, and/or the like that offers a product or service to a purchaser. A merchant may offer, sell, lease, either online or off-line, and/or otherwise provide products and/or services to purchasers.

The terms "purchaser", "customer", "consumer", and "card-holder" may be used interchangeably, and each may include any person, entity, charitable organization, business, or the like which engages in a commercial transaction with a merchant in accordance with various embodiments of the system. A purchaser or card-holder may be an authorized or an unauthorized user of a card number.

An "verification system" may include any person, entity, charitable organization, machine, hardware, software, business, or the like which is capable of verifying a billing address and/or an alternate address offered to a merchant by a card-holder.

As used herein, the scope of "verification" may vary depending on the needs or desires of each system. For example, verification may include verifying at least a portion of the alternate address, the billing address, and/or other relevant information (e.g., associated with the card-holder). Verification may be during the transaction, close in time, or at a time other than during the transaction, simultaneous with another process, and/or the like.

As used herein, a "transaction card issuer", "card issuer", or "host" may be used interchangeably to represent any transaction card issuing institution, such as, but not limited to, a credit card company, a card-sponsoring company, or a third party who is under contract with a financial institution.

An "account number" or "card number", as used interchangeably herein, may include any device, code, or other identifier/indicia suitably configured to allow a purchaser to interact or communicate with the system, such as, for example, an authorization/access code, personal identification number (PIN), Internet code, other identification code, and/or the like, which may be located on a transaction card, such as rewards card, charge card, credit card, debit card, prepaid card, telephone card, smart card, magnetic stripe card, bar code card, radio frequency card, radio frequency fob, and/or the like, and/or card accounts embedded or dynamically downloaded to cellular phones, appliances, and/or other electronics. Although described in association with a transaction card, the account number may be distributed and stored or embodied in any form or medium, including plastic, electronic, magnetic, radio frequency, and/or an optical device capable of transmitting or downloading data from itself to a second device. A customer account number may be, for example, a sixteen-digit transaction card number, although each transaction card issuer may have its own numbering system, such as the fifteen-digit numbering system used by American Express. Generally, a card issuer's transaction card numbers comply with the particular card issuer's standardized format. For example, a card issuer using a sixteen-digit format may use four spaced sets of numbers, as represented by the number "0000 0000 0000 0000". In this example, the first five to seven digits may be reserved for processing purposes and may identify the issuing bank, card type, and/or the like, and the last or sixteenth digit may be used as a sum check for the sixteen-digit number. The intermediary eight-to-ten digits may be used to uniquely identify the customer.

As used herein, "billing address" may include an address that is associated with a card-holder and is recognized as designating the location where a card-holder receives correspondence relating to a customer account (e.g., associated with a transaction card). For example, the billing address is the address to which a card issuer sends correspondence to a card-holder regarding transaction activity on the card-holder's account (e.g., first and last name, address, country, phone number, and/or the like).

An "alternate address" may include an address other than the billing address. For example, the alternate address may be where a card-holder desires a merchant to send a purchased item, e.g., a shipping address. The alternate address may be identical to the billing address or it may be different. The alternate address may be associated with a recipient who is not the card-holder and may be, therefore, different than the billing address.

As used herein, a "payment guarantee" may include a no charge-back guarantee to merchants for fraud or any other guarantee or agreement offered by card issuers to merchants, purchasers, users, and/or the like associated with a transaction.

In accordance with an exemplary embodiment of the present invention, a system and method are provided to facilitate verification of the alternate address and the billing address of a card-holder, e.g., when a purchase for delivery is made. It will be understood that the present invention may be applied outside the context of a card-holder making a transaction, but is illustrated as such for brevity. Verification of addresses and/or other information may be applied to any suitable context.

In this exemplary embodiment, a merchant obtains authentication information from a card-holder who wishes to purchase an item for delivery to a recipient. On the other hand, the recipient and alternate address information is validated by a verification system. If the card-holder and recipient or alternate address information provided by the purchaser correspond to information on record with the card issuer and/or the verification system, the card issuer may offer a payment guarantee to the merchant. Authentication information may include the name of the recipient of the purchased item, the recipient's alternate address (i.e., the shipping address), the recipient's phone number, the service establishment number, the card-holder's name, the card number, the card-holder's billing address, the card-holder's phone number, known information (e.g., PIN number, address), identifying information (e.g., biometrics, photograph, and the like), information possessed (e.g., card), and/or the like. In one exemplary embodiment, card-holder information is validated by the card issuer, e.g., the card issuer authorizes the card-holder to use credit (e.g., credit authorization).

By facilitating the verification of an alternate address, the present invention enhances the ability of a card issuer to offer a payment guarantee to a merchant for a purchase made with a transaction card, even if the purchased item is shipped to an address other than a billing address. Accordingly, the present invention facilitates verification of the billing and alternate addresses in a single transaction. The system and method may include various authorization processes that are known in the art and are used when a card-holder uses a transaction card to effect a purchase transaction with a merchant. The system and method are described associated with a transaction card purchase; however, the present invention may be used with any other transaction (e.g., bank card transactions, any commercial transaction, any area of commerce, and/or the like).

Figure 1:
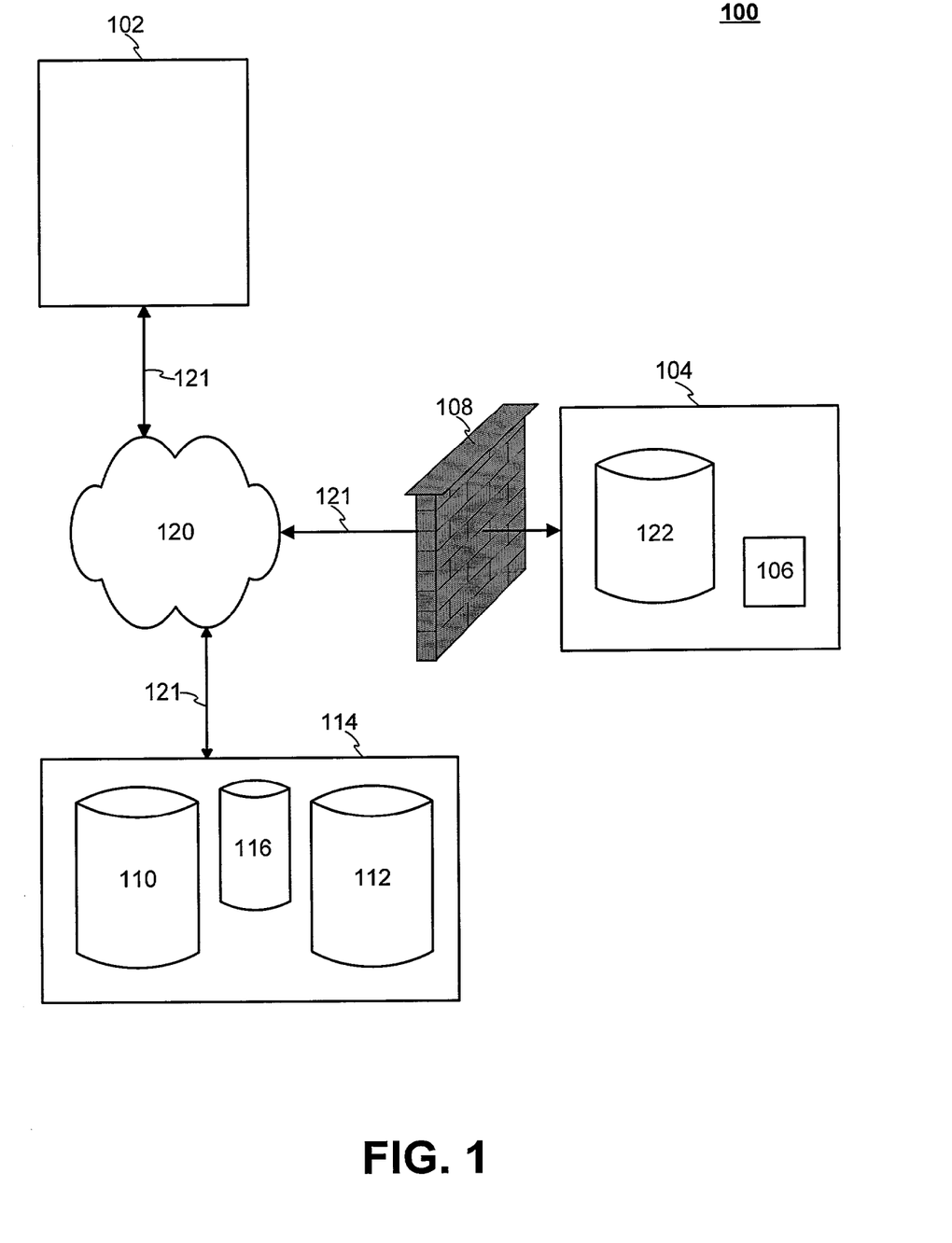
FIG. 1 is a block diagram of a system for address verification in accordance with an exemplary embodiment of the present invention.

FIG. 1 is a block diagram of a system 100 for address verification in accordance with an exemplary embodiment of the present invention. System 100 includes a merchant system 102, a host authorization system 104, and a verification system 114, two or more of which may be configured to communicate through a network 120. Merchant system 102 submits data to host authorization system 104, where merchant system 102 and host authorization system 104 communicate via a communication channel 121. Communication channel 121 may be a part of network 120 or separate depending on the needs of system 100. Data submitted to host authorization system 104 includes information associated with a card-holder (not shown). Verification system 114 is coupled to host authorization system 104 via communication channel 121 and retrieves data from host authorization system 104 associated with the verification of an alternate address of the card-holder. System 100 may verify the alternate address, a billing address of the card-holder, and/or other information, during a single transaction or otherwise. System 100 may verify the alternate address and the billing address simultaneously. Host authorization system 104 provides a payment guarantee for payment to merchant system 102 based on the verification of the alternate address, the billing address, and/or other information.

Network 120 is any hardware and/or software system for enabling communication between merchant system 102, host authorization system 104, and/or verification system 114. For example, network 120 may include any communications system that enables the transmission or exchange of data and/or facilitates electronic commercial transactions. Exemplary networks include the Internet, an intranet, an extranet, a wide area network (WAN), local area network (LAN), satellite communications, and/or the like. In an exemplary embodiment of the present invention, merchant system 102, host authorization system 104, and verification system 114 are coupled to network 120 by any means suitable for connecting a computing system to a network.

In an exemplary embodiment, merchant system 102, host authorization system 104, and verification system 114 may be suitably coupled to network 120 via data links. A variety of conventional communications media and protocols may be used for data links, such as a connection to an Internet Service Provider (ISP) over a local loop, as is typically used associated with standard modem communication, cable modem, Dish networks, ISDN, Digital Subscriber Line (DSL), or various wireless communication methods. Merchant system 102, host authorization system 104, and verification system 114 may each also reside within a LAN, which interfaces to network 120 via a leased line (e.g., T1, D3, and/or the like). Such communication methods are well known in the art and are covered in a variety of standard texts. See, e.g., Gilbert Held, *Understanding Data Communications* (1996), which is hereby incorporated by reference.

Merchant system 102 includes any hardware and/or software suitably configured to store information and interact with the other components of system 100. Merchant system 102 typically resides at a given merchant, either locally, regionally, or at a national headquarters. Although only one merchant system 102 is illustrated in FIG. 1, it will be appreciated that system 100 may include any number of merchant systems 102 in communication with host authorization system 104 and/or verification system 114 through network 120. In the exemplary embodiment, host authorization system 104 and verification system 114 are separate systems, which may be located in one location or remotely located from one another. In an alternate embodiment, verification system 114 may be integrated within host authorization system 104. In such an embodiment, an integrated verification system and host authorization system may be components of a single computing device (e.g., separate modules of a single computing unit) or may be separate components of an integrated computing system, wherein authorization and verification components of the computing system communicate with each other via a network that is separate from network 120, such as via an intranet, a LAN, or a WAN, for example.

In accordance with one aspect of the present invention, host authorization system 104 is any hardware and/or software suitably configured to store information, process information, and interact with the other components of system 100. In one embodiment, host authorization system 104 receives information provided by merchant system 102 regarding a card purchase transaction, processes that information, generates and transmits a request to verification system 114, receives verification information from verification system 114 in response to the transmitted request, and processes verification information from verification system 114 to determine whether to offer a payment guarantee to the merchant who originated the card transaction.

In an exemplary embodiment, host authorization system 104 resides at a transaction card issuer and includes a host database 122 and a timing mechanism 106. In one embodiment, host authorization system 104 performs various authentication processes, such as billing address verification, verification of card-holder information, and credit verification, for example. Host database 122 is configured to store card-holder data, transactional data, and/or any other data related to the use of a transaction card by a card-holder. Host database 122 may include any suitable hardware and/or software configured for storing data. Timing mechanism 106 may be any hardware and/or software suitably configured to record time. Timing mechanism 106 times the response time of verification system 114 to a request by host authorization system 104.

In one embodiment, timing mechanism 106 can be triggered when a request for verification information is sent from host authorization system 104 to verification system 114 and can be stopped when a response is received at host authorization system 104. Timing mechanism 106 verifies that an information request is processed and produces a response quickly and efficiently, so that transactions between merchants and purchasers are not unduly delayed. In an exemplary embodiment, verification system 114 may transmit a response to host authorization system 104 within about one half-second of receiving the alternate address verification request from the card issuer. Such a rapid response time permits transactions between the merchant and the purchaser to proceed without significant delay. If a code is transmitted from verification system 114 in response to a request from host authorization system 104, timing mechanism 106 may be stopped for that request. The time that elapses between when the request was sent to when a code response was received by host authorization system 104 is measured and recorded. If, for example, timing mechanism 106 determines that verification system 114 has a slow response time or is otherwise in error, host authorization system 104 may return an error notification to merchant system 102 and/or verification system 114. Accordingly, timing mechanism 106 helps host authorization system 104 monitor the timing of the verification process.

In another exemplary embodiment, host authorization system 104 may transmit information to verification system 114 through a gateway 108. Gateway 108 may include any hardware and/or software for enhancing security of communications between two systems. For example, gateway 108 may be a dedicated phone line between host authorization system 104 and verification system 114 or a firewall between host authorization system 104 and network 120.

In accordance with an exemplary embodiment of the present invention, a verification system 114 includes a recipient index database 110, an association database 112, and/or any hardware and/or software suitably configured to store information, process information, and interact with the other components of the system 100. Verification system 114 may include a transaction history database 116, which stores information relating to a card-holder and a card-holder's purchases that were made using a transaction card. Although illustrated in FIG. 1 as part of verification system 114, transaction history database 116 may alternatively be a part of merchant system 102, host authorization system 104, and/or wholly separate. For example, when a card-holder purchases an item with a transaction card and requests that the merchant ship the item to a recipient who has an address that is different than the transaction card billing address, information stored in transaction history database 116 may include recipient's name, recipient's address, recipient's phone number, credit card number, and/or a service establishment number which indicates the particular merchant from which the item was purchased. In order to provide global information, transaction history database 116 would include information on users and/or consumers on a world-wide basis.

Transaction history database 116, databases 110, 112, 122, and any other data storage devices referred to herein may include any type of hardware and/or software device, which is configured to store and maintain card-holder transaction data and any other suitable information. Exemplary devices include any suitable type of database, such as relational, hierarchical, object-oriented, and/or the like. Common database products that may be used to implement transaction history database 116, databases 110, 112, 122, and any other data storage devices referred to herein include DB2 by IBM (White Plains, N.Y.), any of the database products available from Oracle Corporation (Redwood Shores, Calif.), Microsoft Access by Microsoft Corporation (Redmond, Wash.), or any other database product. Transaction history database 116, databases 110, 112, 122, and any other data storage devices referred to herein may be organized in any suitable manner including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Verification system 114 may be configured to process and respond to requests from host authorization system 104 for verification information regarding a designated recipient for an item purchased by a card-holder from a merchant. Such verification information may include recipient's name, recipient's address, recipient's phone number, service establishment number (i.e., a number, code, or other identifier/indicia of the merchant's identity and/or the location of the purchase), card number presented to purchase the item, card-holder's name, card-holder's billing or alternate address, card-holder's phone number, and/or the like. By storing and processing such verification information, verification system 114 facilitates a determination by host authorization system 104 regarding whether to offer a payment guarantee to a merchant for the sale of an item for delivery to an address other than a billing address. In an exemplary embodiment, verification system 114 may be operated by a third party verification system, such as Acxiom Corporation of Little Rock, Ark., for example.

In various embodiments, verification system 114 may contain one or more databases, such as recipient index database 110 and association database 112, for example. Each database 110, 112 contains specific information, such as address information, card-holder identity information, and/or the like. In one exemplary embodiment, databases 110 and 112 contain information compiled independently by a third party verification system. A transaction card issuer need not provide the verification system with card-holder information, address information, and/or the like. The functionality of verification system 114 is described in greater detail below, where an exemplary method in accordance with the present invention is set forth.

The system of the invention, as well as any of its component systems, may include a host server or other computing system, including a processor for processing digital data, a memory coupled to the processor for storing digital data, an input digitizer coupled to the processor for inputting digital data, an application program stored in the memory and accessible by the processor for directing the processing of digital data by the processor, a display coupled to the processor and memory for displaying information derived from digital data processed by the processor and a plurality of databases, the databases including client data, merchant data, financial institution data and/or like data that could be used in association with the present invention.

Figure 2:
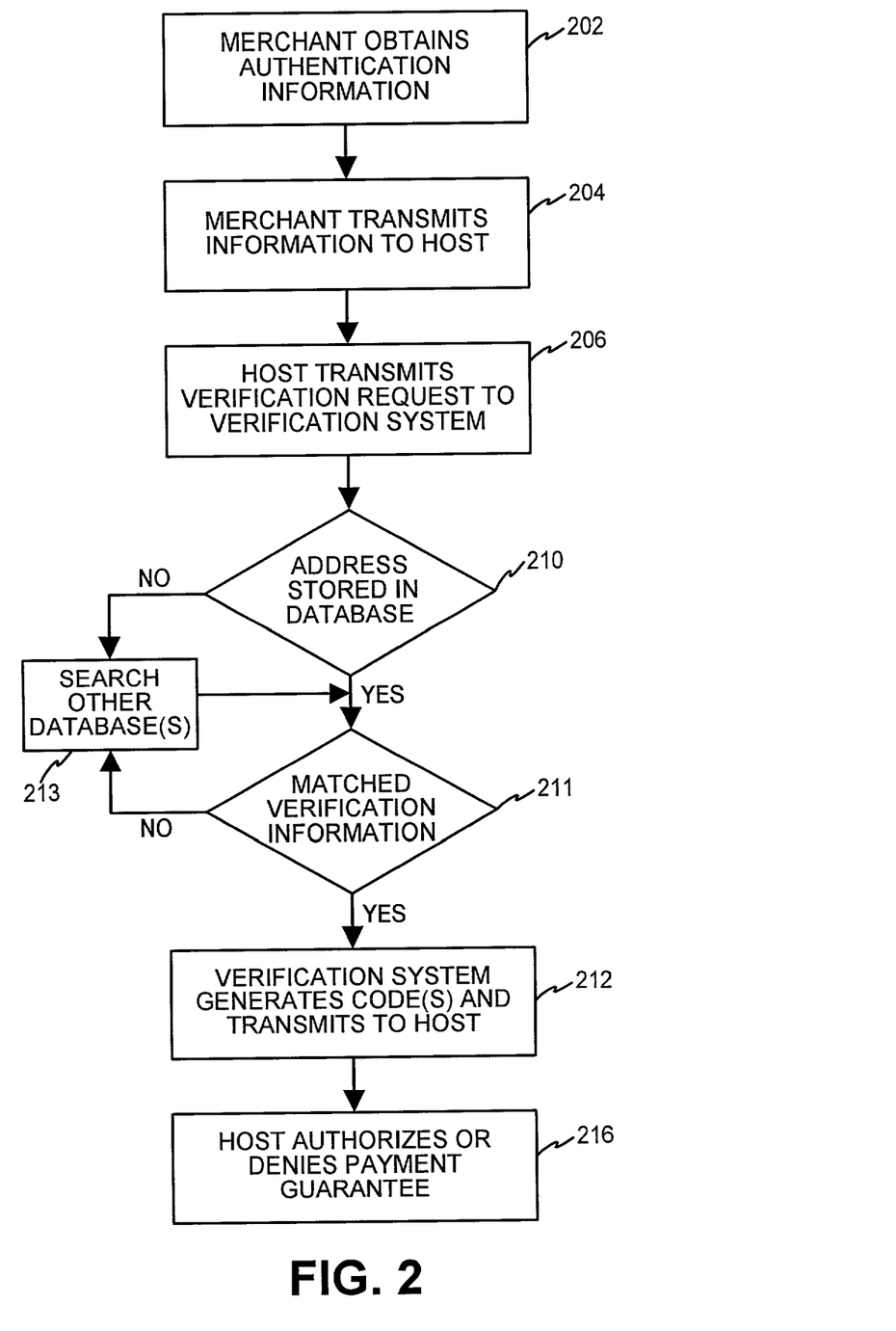
FIG. 2 is a flowchart of a method for address verification in accordance with an exemplary embodiment of the present invention.

FIG. 2 is a flowchart of a method for address verification in accordance with an exemplary embodiment of the present invention. Although FIG. 2 illustrates a series of method steps, it will be realized that the order of particular steps may be altered and/or other steps may be omitted altogether while still attaining the same or a similar result. In accordance with an exemplary embodiment of the present invention, a merchant may obtain authentication information from a prospective transaction card purchaser (step 202). The authentication information may be obtained over the phone, via fax, via an online network (such as the Internet, for example), in-person, or by other means. Merchant system 102 may then be used to transmit this information to host authorization system 104 through network 120 (step 204).

Host authorization system 104 sends at least a subset of the authorization information to verification system 114 (step 206). Host authorization system 104 may transmit the subset of the authorization information to verification system 114 through gateway 108. The subset of information transmitted to verification system 114 may include, for example, card number, recipient's name, recipient's address, recipient's phone number, and the service establishment number. This subset of information (i.e., "verification information") is transmitted to verification system 114 as a "verification request". When a verification request is sent from host authorization system 104 to verification system 114, timing mechanism 106 may be used to monitor the timing of the request.

In accordance with one aspect of the present invention, when verification system 114 receives a verification request, it converts the verification information into a code which may include unique tags (i.e., identifiers) that can be stored and searched. Each component of the verification information may be converted into its own unique tag. For example, one unique tag, referred to as an "index", may identify the alternate address, name, or other information associated with a recipient, user, and/or consumer. When recipient names, addresses, and/or the like are described herein as being stored and/or searched, unique tags may be used to associate the various aspects of the verification information stored and/or searched.

Verification system 114 queries transaction history database 116 to determine whether the address identified by the purchaser as a recipient's address is stored therein (step 210). For example, verification system 114 attempts to verify the alternate address of a card-holder by comparing the alternate address to information stored in one or more databases. If the recipient's address is not stored in transaction history database 116, then verification system 114 generates a code to that effect and transmits the code to host authorization system 104 via gateway 108. Optionally, if the recipient's address is not stored in transaction history database 116, then various other databases may be searched to facilitate determining the address identified by the purchaser as a recipient's address (step 213).

If the recipient address provided during a current card transaction is stored in transaction history database 116, analysis of the verification information continues. Verification system 114 searches transaction history database 116 to determine if the current verification information provided for the current card transaction matches prior verification information that was provided in a prior transaction with the same card number within a predetermined or selected time frame (step 211).

The predetermined time frame before the current transaction may include any suitable time period. For example, the predetermined time frame corresponds to a period of time in which it would be likely that an unauthorized user of the card number would be in the process of making multiple unauthorized card transactions. Exemplary time frames may include the previous 24 hours, the previous 48 hours, the previous 72 hours, the last week, and/or the like. Transaction history database 116 stores verification information obtained from card-holders for a predetermined storage period (e.g., about 24 hours, about 48 hours, about 72 hours, and/or the like). This predetermined storage period enables the comparison of verification information associated with various card transactions involving the same card number over the predetermined time frame. Moreover, the use of a predetermined storage period also permits limitations on the volume of information stored and maintained by verification system 114, so that maintenance of the database does not become overly burdensome and the process of verification is simplified. The predetermined time frame and the predetermined storage period may be selected independently of one another. Alternatively, the predetermined time frame and the predetermined storage time coincide.

Verification system 114 continues its analysis of current verification information by searching index database 110 to determine if the recipient index created by verification system 114 matches an index stored in index database 110. If no match exists, an appropriate code (e.g., one or more fields of information) is generated and transmitted to host authorization system 104 (step 212). Such a code may include at least one selected character or digit, such as an "X" or a "9" to represent various information. Various fields of information optionally include "a" for card-holder name and billing address match, "k" for no match of information, "l" billing address match only, "p" payment guarantee, "x" system not responding, and/or the like. Of course, such codes or fields are optional and vary depending on the needs of system 100.

If there is a match between the recipient index and an index in index database 110, then verification system 114 searches its association database 112 to determine if the recipient phone number and recipient address provided for the current transaction are associated (step 212). If so, this increases the probability that the recipient address is legitimate, and an appropriate code is transmitted to host authorization system 104 indicating that the recipient's phone number and address are associated. Verification system 114 also searches association database 112 to determine if the recipient address is a business. If so, an appropriate code is transmitted to host authorization system 104 indicating that the recipient's address is a business. Additionally, to determine whether to further analyze the verification information, verification system 114 searches association database 112 to determine whether the current recipient's name and address match a name and address stored in association database 112. If so, the analysis continues. If not, an appropriate code is transmitted to host authorization system 104 indicating that there is no name and address match. Verification system 114 uses its index database 110 to determine if the recipient name is associated with the recipient address. If so, this increases the probability that the address is legitimate, and an appropriate code is transmitted to host authorization system 104 indicating the association of the recipient's name and address. If not, then an appropriate code is returned indicating that there is no match.

If verification information provided by a card-holder matches verification information that was provided for a purchase made within the predetermined time frame, the verification system 114 transmits the same code that was originally generated for the most recent prior card transaction to host authorization system 104 (step 212). In this manner, verification system 114 identifies the card number being used in a current transaction as having been used to purchase and deliver an item to the same alternate address within the recent past. The host authorization system 104 receives and processes this code to determine whether the card issuer will authorize a payment guarantee to the merchant for the sale of an item shipped to the designated recipient. Use of the same code for a current purchase that was generated for the most recent matching card number transaction efficiently indicates to the card issuer that the card has been used previously as a means for obtaining and sending purchases to an alternate address that is different than the billing address, and further analysis of verification information by verification system 114 is not required.

If current verification information provided by a card-holder does not match any prior verification information stored in transaction history database 116, various other databases may be searched for a predetermined time period, as discussed above, in order to facilitate determining the address identified by the purchaser as a recipient's address (step 213). Verification system 114 sends tagged and coded current verification information to transaction history database 116 for storage. For example, the verification information is stored in transaction history database 116 for the predetermined storage period and is compared with future transactions to determine whether a verification information match exists. Codes that may be generated during subsequent process steps that are performed using current verification information are transmitted to transaction history database 116, so that these codes may be associated with the stored verification information.

Host authorization system 104 uses any or all of the transmitted codes to determine whether to offer a payment guarantee to a merchant for the current card transaction (step 216). Host authorization system 104 receives and processes the code and then uses the information provided by the transmitted code to determine whether to authorize or deny a payment guarantee to the merchant. For example, host authorization system 104 may provide a payment guarantee if the alternate address is verified. Alternatively, host authorization system 104 may provide a payment guarantee if the billing address and the alternate address are verified in one transaction. Host authorization system 104 may inform merchant system 102 of whether a payment guarantee will be granted, and the merchant may authorize or deny a purchase transaction with a card-holder based upon whether the payment guarantee is granted. Information related to authorized or denied transactions may optionally be stored in transaction history database 116.

In the foregoing specification, the invention has been described with reference to specific embodiments. Various modifications and changes can be made, however, without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", "includes", "including", or any other variations thereof, are intended to cover a non-exclusive inclusion, such that a process, method, article, or apparatus that comprises or includes a list of elements does not include only those elements but may include other elements not expressly listed or inherent to such process, method, article, or apparatus. Further, no element described herein is required for the practice of the invention unless expressly described as "essential" or "critical."

What is claimed is:

1. A system for facilitating verification of an alternate address, comprising:
    a merchant system for submitting data to a host authorization system, wherein the merchant system and the host authorization system communicate via a communication channel and the data submitted to the host authorization system includes information associated with a card-holder; and
    a verification system coupled to the host authorization system via the communication channel for retrieving data from the host authorization system associated with the verification of the alternate address of the card-holder, wherein the host authorization system provides a payment guarantee for payment to the merchant system based on the verification of the alternate address.

2. The system of claim 1, wherein the alternate address is different from the card-holder's billing address.

3. The system of claim 1, wherein the communication channel includes a network coupled between the merchant system, host authorization system, and the verification system for facilitating communication between the merchant system, host authorization system, and the verification system.

4. The system of claim 1, wherein the host authorization system includes a timing mechanism for timing the response time of the verification system to a request by the host authorization system.

5. The system of claim 1, wherein the host authorization system and the verification system communicate via a gateway.

6. A system for facilitating verification of an alternate address, comprising:
    a merchant system for submitting data including the alternate address to a host authorization system, wherein the merchant system and the host authorization system communicate via a communication channel and the data submitted to the host authorization system includes information associated with a card-holder; and verification system coupled to the host authorization system via the communication channel for retrieving data from the host authorization system associated with the verification of the alternate address of the card-holder, wherein the verification system:

initially searches a database by comparing the submitted alternate address to information stored in the database; and verifies a billing address of the card-holder and the alternate address during a single transaction.

7. The system of claim 6, wherein the billing and alternate addresses are verified simultaneously.

8. A system for facilitating verification of an alternate address, comprising:

a host authorization system including a processor for processing data associated with the alternate address of a card-holder;

a memory coupled to the processor for storing the data;

an input digitizer coupled to the memory and the processor for inputting the data into the memory; and an application program stored in the memory and accessible by the processor for directing processing of the data by the processor, wherein the application program is configured to facilitate the steps of:

receiving card-holder authentication information including the alternate address, wherein the alternate address is different from the card-holder's billing address;

comparing the alternate address to information stored in one or more databases; and determining whether to offer a merchant a payment guarantee based upon comparing the alternate address to information stored in one or more databases.

9. A method for facilitating verification of an alternate address of a card-holder associated with a transaction, comprising the steps of:

verifying the alternate address of a card-holder by electronically comparing the alternate address to information stored in one or more databases, wherein the alternate address is different from a billing address of the card-holder; and providing a payment guarantee if the alternate address is verified.

10. A method for facilitating verification of a billing address and an alternate address of a card-holder associated with a transaction, comprising the steps of:

using information stored in one or more database, electronically verifying the billing address and the alternate address of a card-holder in one transaction associated with the card-holder; and providing a payment guarantee if the billing address and the alternate address are verified.

11. A method for facilitating verification of an alternate address of a card-holder, comprising the steps of:

receiving card-holder authentication information including the alternate address, wherein the alternate address is different from the card-holder's billing address;

electronically comparing the alternate address to information stored in one or more databases; and determining whether to offer a merchant a payment guarantee based upon comparing the alternate address to information stored in one or more databases.

12. The method of claim 11, wherein the card-holder authentication information includes at least one of a card-holder's name, the card-holder's billing address, a card-holder's phone number, a card number, a recipient's name, the alternate address, a recipient's phone number, and a service establishment number.

13. A method for facilitating verification of an alternate address, comprising the steps of:

receiving, by a merchant system, alternate address information from a card-holder;

communicating the alternate address information to a card issuer;

communicating, by the card issuer, the alternate address information to a verification system;

searching a database initially by comparing the received alternate address to information stored in the database;

comparing, by the verification system, the alternate address information to stored address information; and authorizing or denying a transaction based upon comparing the alternate address information to stored address information.

14. The method of claim 13, wherein the alternate address information includes at least one of the card number and printed name of the card-holder's transaction card, the billing address of the card-holder's transaction card, the billing phone number of the card-holder's transaction card, the name of a party to whom purchased goods are to be shipped, the alternate address, and the alternate phone number.

15. The method of claim 13, wherein comparing the alternate address information to stored address information further includes the steps of:

converting the alternate address information into one or more identification tags;

comparing the one or more identification tags to stored identification tags representing prior alternate addresses;

determining whether the one or more identification tags match any of the stored identification tags;

translating the determination into a code; and communicating the code to the transaction card issuer.

16. The method of claim 13, wherein authorizing or denying a transaction further includes the steps of:

processing information received from the verification system to determine whether the transaction should be authorized or denied; and communicating, to the merchant system, whether the transaction is authorized or denied.

17. A method for facilitating verification of information associated with a transaction, comprising the steps of:

electronically accessing information stored in one or more databases associated with a consumer and a recipient;

verifying at least two addresses in one transaction, wherein one address is associated with the consumer and one address is associated with the recipient; and providing a payment guarantee to a merchant involved in the transaction if the two addresses are verified.

* * * * *